(12) United States Patent
Colombi et al.

(10) Patent No.: US 7,768,805 B2
(45) Date of Patent: Aug. 3, 2010

(54) CLEAN INPUT UPS WITH FAST RECTIFIER CONTROL AND IMPROVED BATTERY LIFE

(75) Inventors: Silvio Colombi, Losone (CH); Claudio Balblano, Saltrio (IT)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 11/684,480

(22) Filed: Mar. 9, 2007

(65) Prior Publication Data
US 2008/0219036 A1    Sep. 11, 2008

(51) Int. Cl.
*H02M 7/02* (2006.01)
*H02M 7/12* (2006.01)

(52) U.S. Cl. .......................... 363/89; 363/127
(58) Field of Classification Search ................... 363/84, 363/89, 127; 307/44–46, 48, 64–66, 68
See application file for complete search history.

(56) References Cited

U.S. PATENT DOCUMENTS

| | | | | |
|---|---|---|---|---|
| 4,761,725 A | * | 8/1988 | Henze | 363/46 |
| 5,031,087 A | * | 7/1991 | Tuusa | 363/63 |
| 5,499,178 A | * | 3/1996 | Mohan | 363/39 |
| 5,594,630 A | * | 1/1997 | Baker | 363/40 |
| 5,905,644 A | * | 5/1999 | Blasko et al. | 363/41 |
| 6,693,409 B2 | * | 2/2004 | Lynch et al. | 323/208 |
| 2002/0036911 A1 | * | 3/2002 | Okui | 363/95 |
| 2005/0207192 A1 | * | 9/2005 | Fu et al. | 363/89 |

* cited by examiner

*Primary Examiner*—Gary L Laxton
*Assistant Examiner*—Nusrat J Quddus
(74) *Attorney, Agent, or Firm*—Global Patent Operation

(57) ABSTRACT

The present invention relates to the control of active rectifiers for UPS systems. Aspects of the present invention relate to a control algorithm that is implemented to realize a fast rectifier control operation that results in the improved life of a battery that is linked to the active rectifier of the UPS system. Within aspects of the present invention under unbalanced load conditions, it is possible to select the desired behavior between the two possible extreme conditions, i.e. implement a clean power input that results in the reduced life of the battery or implement a non-clean power input resulting in the improved life of the battery. Additionally, the present invention utilizes fast rectifier control and specific feed-forward action to make it possible to obtain the very rigid control of a dc link voltage, even under extreme step load variations.

15 Claims, 5 Drawing Sheets

CLEAN INPUT UPS WITH FAST RECTIFIER CONTROL AND IMPROVED BATTERY LIFE

BACKGROUND OF THE INVENTION

1. Field of the Invention

This invention relates to uninterruptible power supplies, and particularly to the control of active rectifiers for uninterruptible power supplies.

2. Description of Background

Batteries that are implemented within, uninterruptible power supply (UPS) systems typically surfer from ripple currents and fast discharge pulses that can affect the life of a system-linked battery. Under unbalanced load conditions, an output inverter draws at twice the mains frequency from a direct current (dc) Sink and an oscillating current that is produced by a rectifier and the battery. Normal rectifiers can only provide the mean value of this oscillating current, therefore, the ripple current must be drawn from the battery, thus affecting the life of the battery. In the event that a UPS load is unbalanced then, the associated active power is not constant. In this instance there is the possibility for two extreme operating conditions to exist. The first operating condition requires the drawing of constant active power from a utility, thus resulting in the acquisition of sinusoidal currents at the price of producing a high current ripple on the battery. The second operating condition requires the drawing of oscillating active power from the utility, and therefore acquiring non-sinusoidal currents, wherein the operation is ideally implemented without drawing any battery current.

Conventionally, six or twelve pulse thyristor rectifiers, sometimes in combination with passive filters, have been used as inputs for an uninterruptible power supply (UPS). However, using these particular topologies, it was not possible to obtain the fast current control that is required to solve the above-mentioned problems. Currently, more modern power topologies are utilized to realize clean input UPSs that can draw sinusoidal currents from the mains at a high power factor. Typical front-end converters include current or voltage source rectifiers, these often being referred to as IGBT rectifiers. These converters make it possible to reach a required bandwidth for instituting a current control operation. However, additional control effort is required to take advantage of this fast current control in order to solve the mentioned problems, i.e. increase the battery life and obtain a very stiff dc link voltage control.

SUMMARY OF THE INVENTION

The present invention relates to the control of active rectifiers for uninterruptible power supplies. More specifically, aspects of the present invention comprise an active rectifier control system that is configured to enhance the response control performance for an uninterruptible power supply (UPS) system for servicing a load, the active rectifier control system providing rigid control of a direct current (dc) link voltage resulting from the combined linked outputs of a battery and the active rectifier, thus reducing the power drawn from the battery. The control system comprises a feed-forward voltage controller, the feed-forward voltage controller comprising a proportional-integral (PI) controller component, the PI controller component being configured to determine a voltage error reference current value in response to a dc voltage reference and a dc voltage input values, and a feed-forward current determining component, the feed-forward current determining component being configured to determine a feed-forward current value in response to an active current input value.

The control system further comprises a variable limitation component, the variable limitation component being configured to determine a limited reference current value in response to a dc reference input value, and a current control component, the current control component being configured to receive the determined limited reference current value from the variable limitation component, wherein the determined limited reference current value is utilized as a reference value for a lower level current controller.

Further aspects of the present invention relate to an active rectifier control system method for enhancing the response control performance of an uninterruptible power supply (UPS) system for servicing a load, the method comprising determining an active power load value, dividing the active power load value by a dc voltage value in order to determine an active current input value, determining a feed-forward current value, and determining a voltage error reference current value. The method further comprises determining a dc reference input value from a summation of the voltage error reference current value and the feed-forward current value, providing the dc reference input value to a variable limitation component, wherein the variable limitation component is configured to utilize the dc reference input value to calculate a limited reference current value, and providing the limited reference current value to a current control component.

Additional features and advantages are realized through the techniques of the present invention.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention together with advantages and features, by way of example, with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

The present invention relates to UPS systems, in particular with the control of active rectifiers for UPS systems. In operation, active rectifiers are used to realize clean input UPS systems that can draw sinusoidal currents from mains at a high power factor. Aspects of the present invention relate to a control system, wherein the control system is implemented to realize fast rectifier control operations that result in the improved life of a battery that is linked to the active rectifier of the UPS system. Within aspects of the present invention under unbalanced load conditions, it is possible to select the desired behavior between the two possible extreme conditions—that is the implementation of a clean power input that results in the reduced life of the battery or the implementation a non-clean power input that results in the improved life of the battery. Additionally, the present invention utilizes fast rectifier control to make it possible to obtain the very rigid control of a dc link voltage, even under extreme step load variations. This aspect also results in an improved battery life (no energy is drawn from the battery during step bad variations), an increased dynamic stiffness of the output inverter, as well as the increased reliability of the power converters; especially in the instances that the battery is not connected or an alternative energy storage system is used.

As mentioned above, the present control system makes it possible to minimize the ripple current drawn from the battery under unbalanced conditions. Additionally, the fast rectifier control that is implemented within the control system allows for the possibility to obtain very rigid control of the dc link voltage even under extreme step load variations. This functional aspect is accomplished by first minimizing the amount of energy drawn from the battery during important step load, variations, and secondly, obtaining an increased dynamic stiffness of the output inverter (this aspect is very useful in the instances where pulsating loads exist, such as medical imaging systems). Finally, by avoiding high dc link voltages under sudden load release, an increased reliability of the power converters is obtained, especially if the battery is not connected or in case an alternative energy storage system is used.

Figure 1:
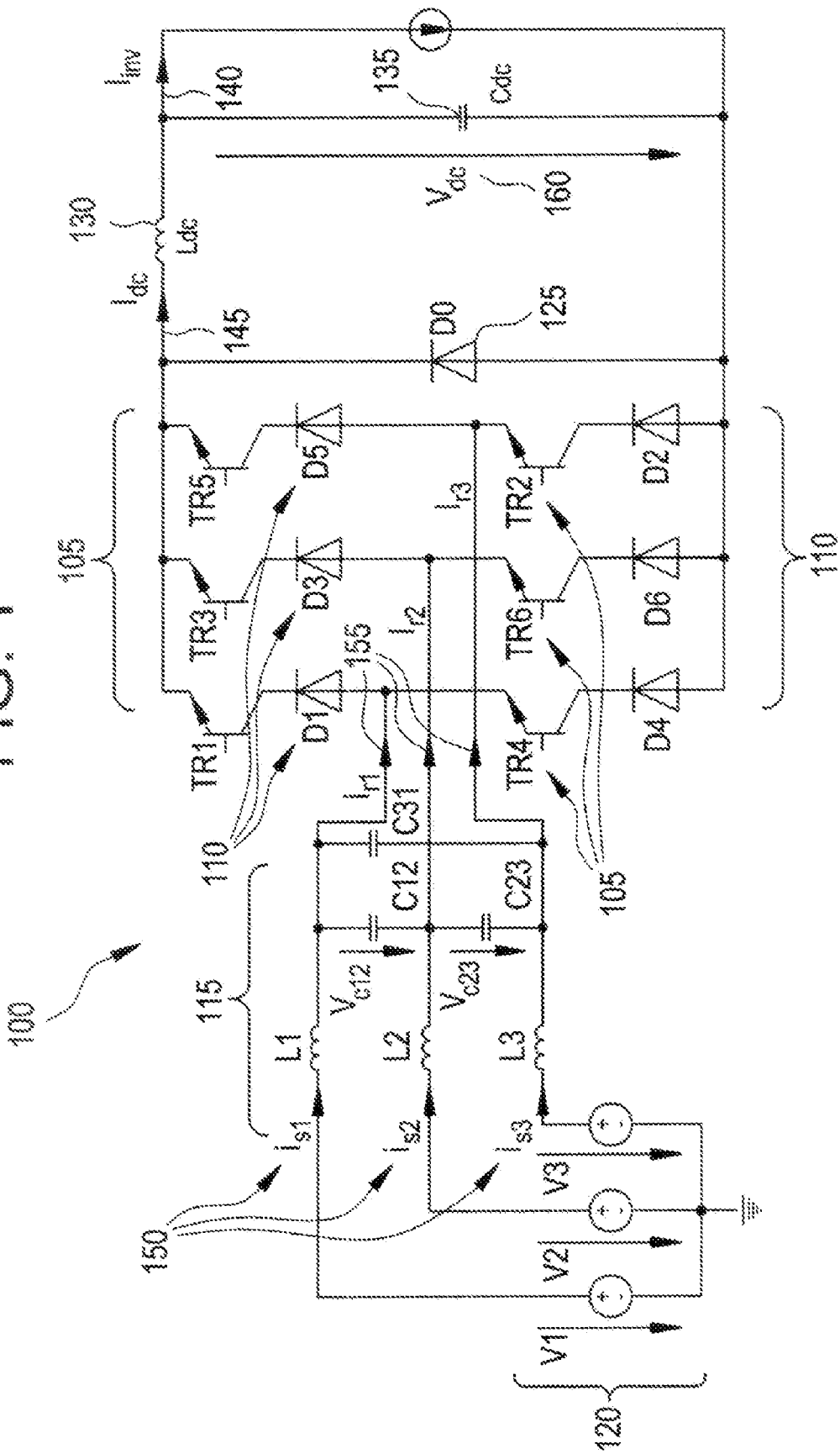
FIG. 1 is a diagram illustrating aspects of a current source rectifier that may be implemented within embodiments of the present invention.

FIG. 1 illustrates aspects of the topology of a current source rectifier that can be implemented within embodiments of the present invention. As shown in FIG. 1, the converter 100 is composed of a bridge with six IGBTs 105 (TR1 to TR6) and six diodes 110 (D1 to D0). The AC side of the bridge comprises a three-phase LC filter 115 (L1, L2, and L3, and C12, C23, and C31) and is used to avoid injecting high frequency switching harmonies into the grid 120 (voltage sources V1, V2, and V3). The DC sine of the bridge comprises a tree wheeling diode D0 125, a filter inductance $L_{dc}$ 130, and a dc link capacitor $C_{dc}$ 135. The current source $i_{inv}$ 140 represents the current drawn by an inverter. The basic operation of the rectifier 100 is explained as follows. Assuming a constant dc link current $i_{dc}$ 145 and a proper modulation of the six switches 105, it is possible to create three sinusoidally pulse width-modulated currents 155 ($i_{r1}$, $i_{r2}$, and $i_{r3}$). As seen from the utility and through the three-phase LC filter 115, these currents are the three-line currents 150 $i_{s1}$, $i_{s2}$, and $i_{s3}$, and are controlled to he sinusoidal.

This exemplarily configuration presents two systematic control problems. The first problem relates to current control, that is it is desirable to draw three sinusoidal currents 150 $i_{s1}$, $i_{s2}$, and $i_{s3}$ while concurrently compensating the resonance of the LC filter 115. This problem is dealt with in a two-phase reference frame that rotates at the mains frequency. By performing the required transformations of the AC side of the converter, one obtains the two circuits (205, 210) represented in FIG. 2. In reality the two circuits would be coupled, but for the purpose of this control example the coupling will be ignored.

Figure 2:
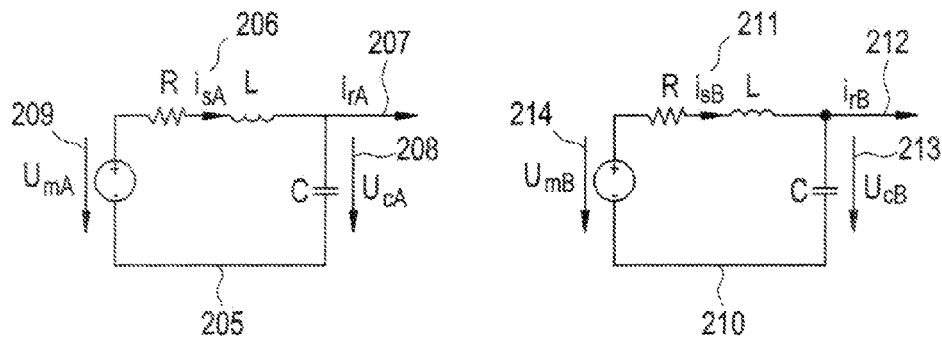
FIG. 2 is a diagram illustrating a two-phase representation of the AC component of the current source rectifier of FIG. 1.

In steady state, ail the sinusoidal variables of the AC side of the converter of FIG. 1 become constant variables in the rotating two-phase representation of FIG. 2. This allows a state space control with disturbance feed-forward to be designed around the two circuits of FIG. 2. Specifically, the state variables are the line currents $i_{sA}$, and $i_{sB}$ (206, 211), and the filter capacitor voltages $u_{eA}$, and $u_{eB}$ (208, 213). The disturbance variables are the utility voltages $u_{mA}$, and $u_{mB}$ (209, 214), and the command variables are the currents $i_{rA}$, and $i_{rB}$ (207, 212). These are the rotating two-phase reference frame transformation of the three currents 155 $i_{r1}$, $i_{r2}$, and $i_{r3}$, of FIG. 1. These currents are obtained through a pulse width modulation of the dc link current $i_{dc}$ 145 acting on the six switches 105 TR1 to TR6. It is common here to use a current state space modulation using directly the two variables $i_{rA}$, and $i_{rB}$ (207, 212). The performance that can be obtained in term of input current total harmonic distortion (THD) is limited by the switching frequency and the size of the filter inductances L1, L2, and L3 of the LC filter 115. There is a trade off to be made between input current THD, switching losses and filter inductance size.

With reference to FIG. 1, the second control problem presented is how to obtain the very rigid control of the dc link voltage $V_{dc}$ 160, even under extreme step load variations, as represented by the inverter load current $i_{inv}$ 140. As discussed above, the very rigid control of the dc link voltage introduces several advantages. First, the amount of energy drawn from a battery during important step load variations is minimized, thus resulting in an increase in the life of the battery. Second, an increased dynamic stiffness of the output inverter is obtained. As mentioned above, this particular aspect is very useful in the case of pulsating load systems such as medical imaging systems. Finally, by avoiding high dc link voltages under sudden load release, an increased reliability of the power converters is obtained, especially if the battery is not connected or in case an alternative energy storage system is used.

Figure 3:
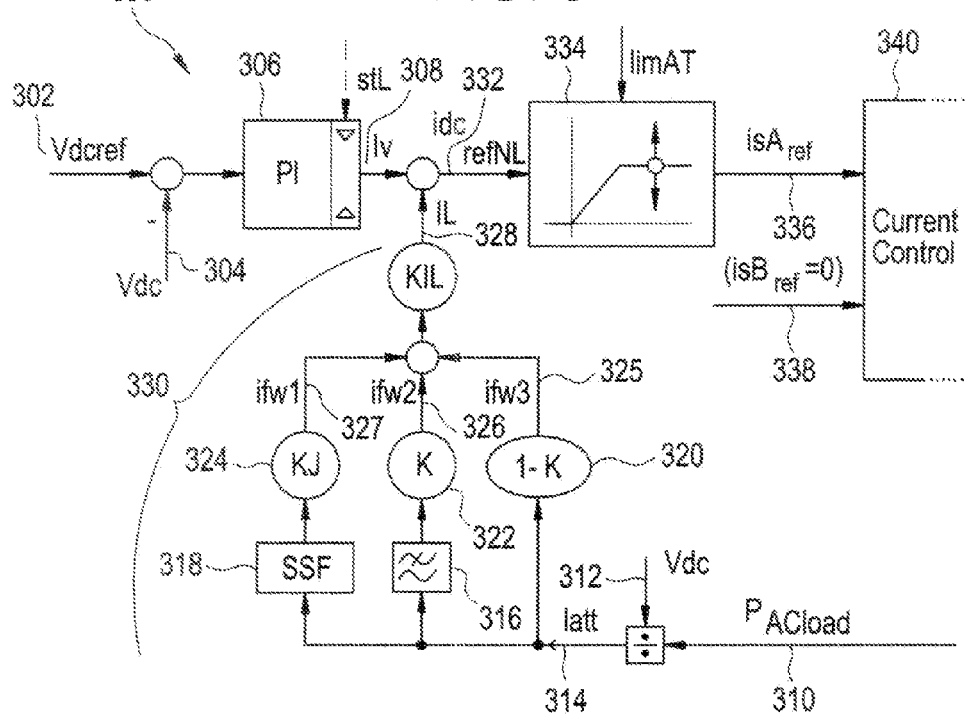
FIG. 3 is a diagram detailing aspects of a feed-forward voltage controller that may be implemented within embodiments of the present invention.

With reference to FIG. 1, the control of the dc link voltage $V_{dc}$ 160 is obtained by making the dc link current $i_{dc}$ 145 follow a reference value $idc_{ref}$. This is realized in the voltage controller 300 as represented in FIG. 3. The reference value $i_{dcrefNL}$ 332 is composed of two terms. The first term $I_r$ 308 is coming from a standard PI controller component 306, the PI controller component 306 being fed by the voltage error represented by $V_{dcref}V_{dc}$ (302, 304). The second term $I_L$ 328 is a feed-forward term, based on the instantaneous active power $P_{ACload}$ 310 dissipated by the load at the inverter output. The total reference current $i_{dcrefNL}$ 332 is then passed through a variable limitation component limAT 334, required to control all the possible operating conditions related to the battery. The limited reference current $i_{sAref}$ 336 is the reference current for the component 205 (FIG. 2) of the line current controller. Accordingly, for the component 210, $i_{sBref}$ 338 of the same is set to 0 in order to draw sinusoidal currents from the utility at a unity power factor. The focal point of the invention is the feed-forward term $I_L$ 328, composed from the three terms $I_{fw1}$, $I_{fw2}$ and $I_{fw3}$ (325, 326, and 327).

Figure 4:
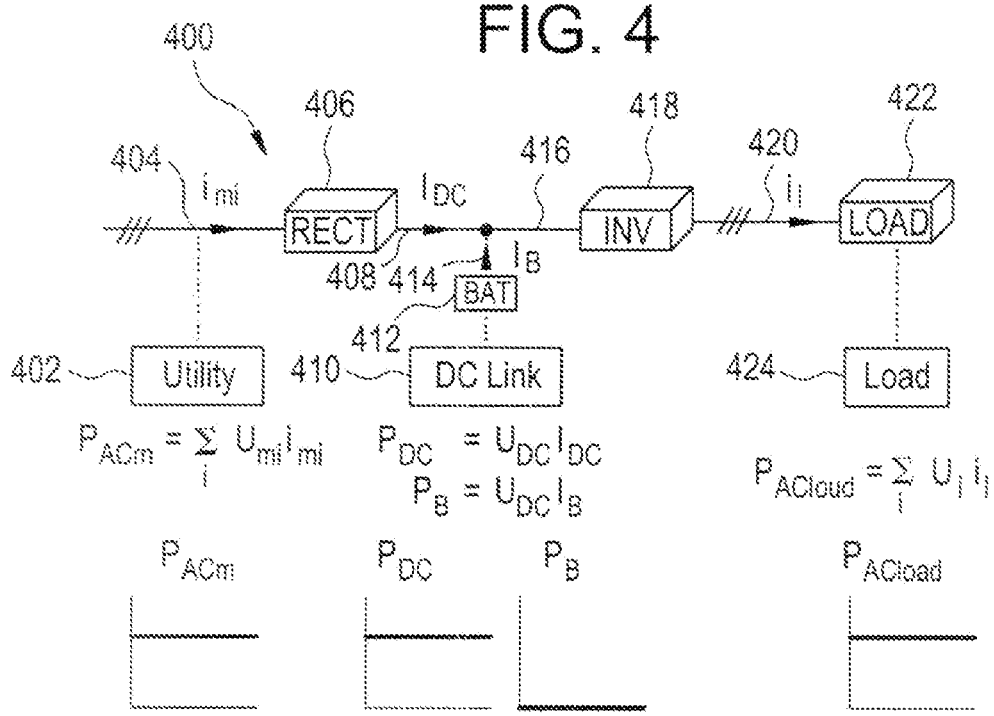
FIG. 4 is a diagram illustrating active power distribution in the instance of a balanced linear load.
Figure 5:
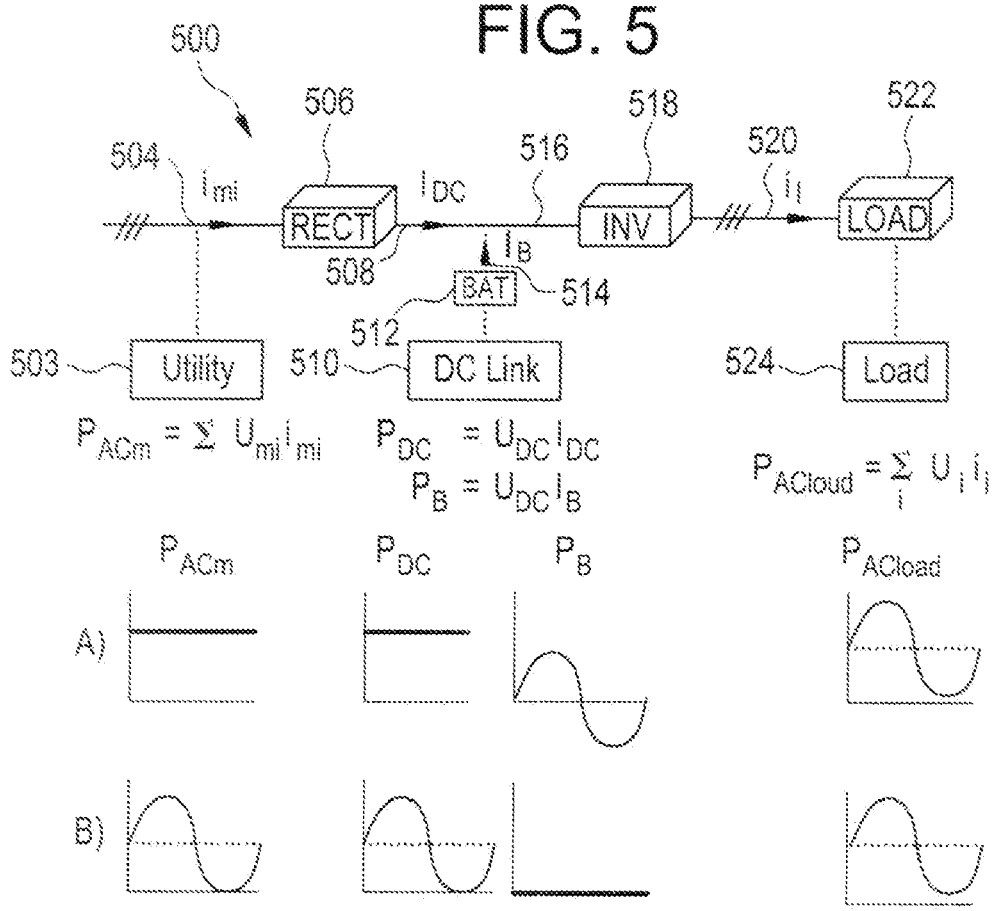
FIG. 5 is a diagram illustrating active power distribution in the instance of an unbalanced linear load.

The feed-forward terms $I_{fw1}$, $I_{fw2}$ and $I_{fw3}$ (325, 326, and 327) will be explained with regard to FIGS. 4 and 5 representing the active power distribution in a UPS system in case of balanced and unbalanced load, respectively. These figures indicate the active power in various points inside the UPS system, in particular: $P_{ACin}$ is the active power drawn from the utility 402, $P_{DC}$ is the active power provided by the rectifier 406, $P_B$ is the active power provided by the battery 412 and $P_{ACload}$ is the active power drawn from the load 422. These powers can be determined by the following equations:

$$P_{ACin} = \sum_i u_{mi} i_{mi} \qquad \text{Eq. 1}$$

$$P_{DC} = U_{DC} I_{DC} \qquad \text{Eq. 2}$$

$$P_B = U_{DC} I_B \qquad \text{Eq. 3}$$

$$P_{ACload} = \sum_i u_i i_i \qquad \text{Eq. 4}$$

Within theses equations $u_i$ and $i_i$ are the ac load phase voltages and currents, $u_{mi}$ and $u_{mi}$ are the ac phase voltages and currents at the UPS input, $U_{DC}$ is the dc link voltage, $I_{DC}$ 408 is the dc current provided by the rectifier and $I_B$ 414 is the dc current provided by the battery 412.

Assuming a perfect efficiency of the UPS, the total active power has to be conserved in any point of the system, in particular:

$$P_{ACload} = P_{DC} + P_B = P_{ACin} \qquad \text{Eq. 5}$$

This equation specifies that the active power required by the load have to come from the utility and from the battery.

In case of a balanced linear load at the UPS output 424 as presented in FIG. 4, equation 4 shows that $P_{ACload}$ is constant. Therefore, equations 5 and 1 state that sinusoidal currents $i_{mi}$ can be drawn from the utility without drawing current from the battery 412.

In case of an unbalanced linear load at the UPS output 524 as presented in FIG. 5, equation 4 shows that $P_{ACload}$ has a sinusoidal variation at twice the utility frequency. Therefore, two extreme eases can occur as stated by equations 5 and 1. In the first case (labeled as A in FIG. 5), the battery 512 provides the oscillating component of $P_{ACload}$ whereas a constant active power is drawn from the utility 502. This means that sinusoidal currents $i_{mi}$ 504 can be drawn from the utility at the price of a reduction in the life of the battery that is due to the ripple on the battery current. In the second case (labeled as B in FIG. 5), the rectifier 506 provides the entire active power required, in particular including the oscillating component. Therefore, the life of the battery 512 is not reduced, but as a result it is not possible to draw sinusoidal currents from the utility 502.

This second mode of operation requires an active rectifier with a fast current control in order to follow the required sinusoidal variation of the dc current $I_{DC}$ 508. Typically, this was not possible with the standard six pulse thyristor rectifiers. With reference to FIG. 3, we will describe how any operation mode between the two scenarios as described above can be obtained with the proposed voltage controller 300. The active power required by a load is divided by the dc link voltage $V_{dc}$ 312 to form the total dc current $I_{att}$ 314. Through the parameter K (variable between 0 and 1), the current $I_{att}$ 314 can pass in the desired proportion between the second and third branch (320, 322) of the feed-forward network, terms $I_{fw2}$ and $I_{fw3}$ (326, 325).

In particular, by setting the parameter K equal to 1, the entire current $I_{att}$ 314 will pass through a low pass filter 316 to form the feed-forward term $I_{fw2}$ 326. In case of unbalanced load we obtain then the mode of operation described above, that is sinusoidal currents $i_{mi}$ can be drawn from the utility at the price of a ripple in the battery current (i.e., at a reduction in the life of the battery). On the other hand, by setting the parameter K equal to 0, the entire current $I_{att}$ 314 will form the feed-forward term $I_{fw3}$ 325. In case of unbalanced load we then obtain the mode of operation as described above, which is that the battery life is not reduced, but it is not possible to draw sinusoidal currents from the utility. Any operation mode between the two extreme cases described can be obtained by using a value of K between 0 and 1.

Within The third branch of the feed-forward network of FIG. 3, the term $I_{fw1}$ 327 is determined by passing the current $I_{att}$ 314 through a selective step filter 318 and a parameter KJ 324. This feed-forward term is responsible to guarantee a high stiffness of the voltage control during important load steps. Basically, due to the selective step filter, $I_{fw1}$ 327 is active only for a short time after a load step change, therefore, any permanent oscillation of $I_{att}$ 314 will be filtered out.

Within aspects of the present invention the selective step filter can be realized in different ways (e.g., by use of Fast Fourier Transform (FFT) techniques, band-pass filters, etc.). Typically, $I_{att}$ 314 can contain oscillatory components at twice the utility frequency (in the ease of an unbalanced load) or at six times the utility frequency (in the case of a nonlinear or computer load). Specifically, the selective step filter is designed to have a high damping of all of the oscillatory components of $I_{att}$ 314.

As discussed before, the very stiff control of the dc link voltage introduces several advantages. First, the amount of energy drawn from the battery during important step load variations is minimized, and as such, provides an Increased battery life. Second, an increased dynamic stiffness of the output inverter is obtained. Finally, by avoiding high dc link voltages under sudden load release, an increased reliability of the power converters is obtained, especially if the battery is not connected or in case an alternative energy storage system is used.

Figure 6:
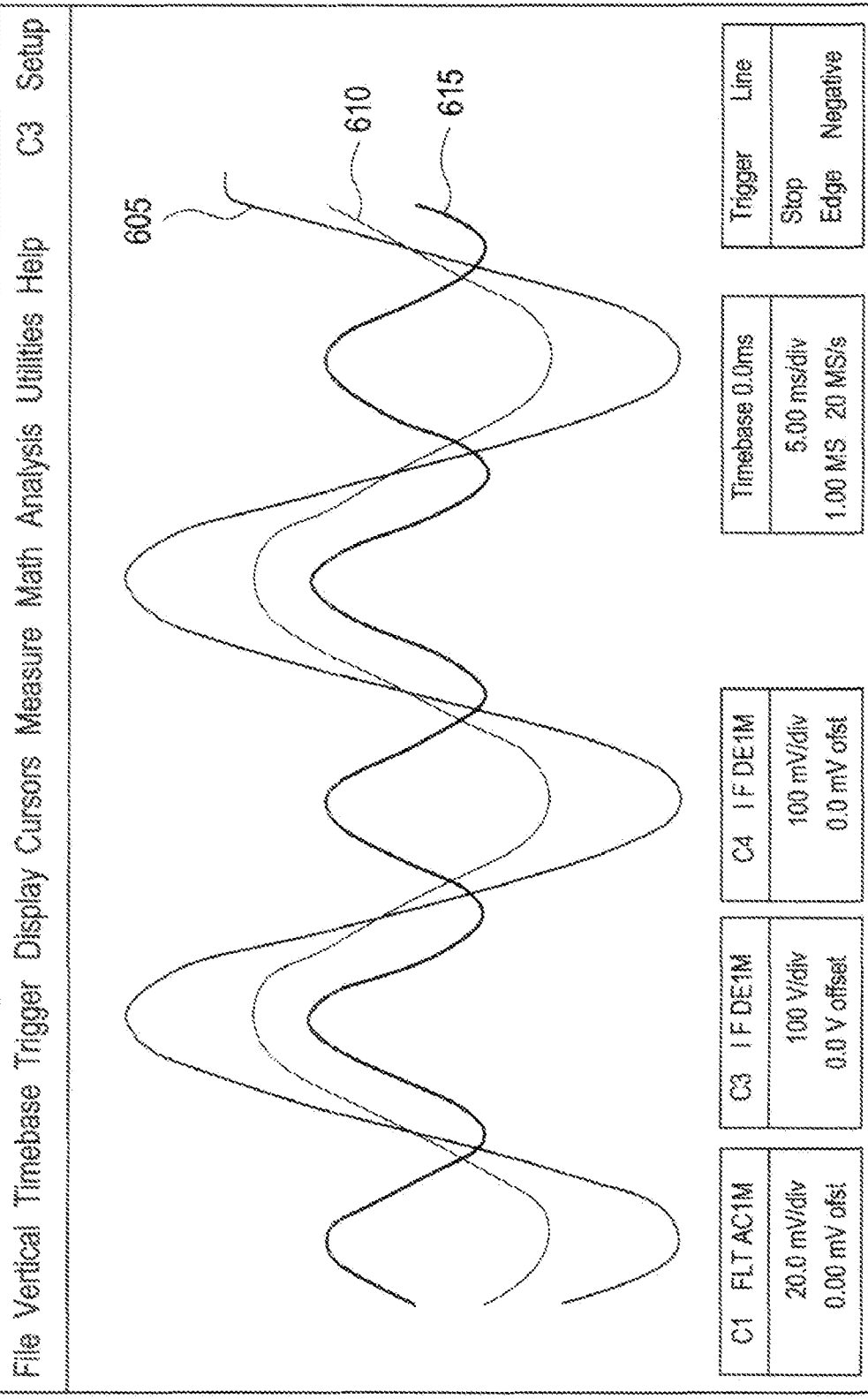
FIG. 6 is a screenshot illustrating an unbalanced linear load with a variable parameter of K=1.
Figure 7:
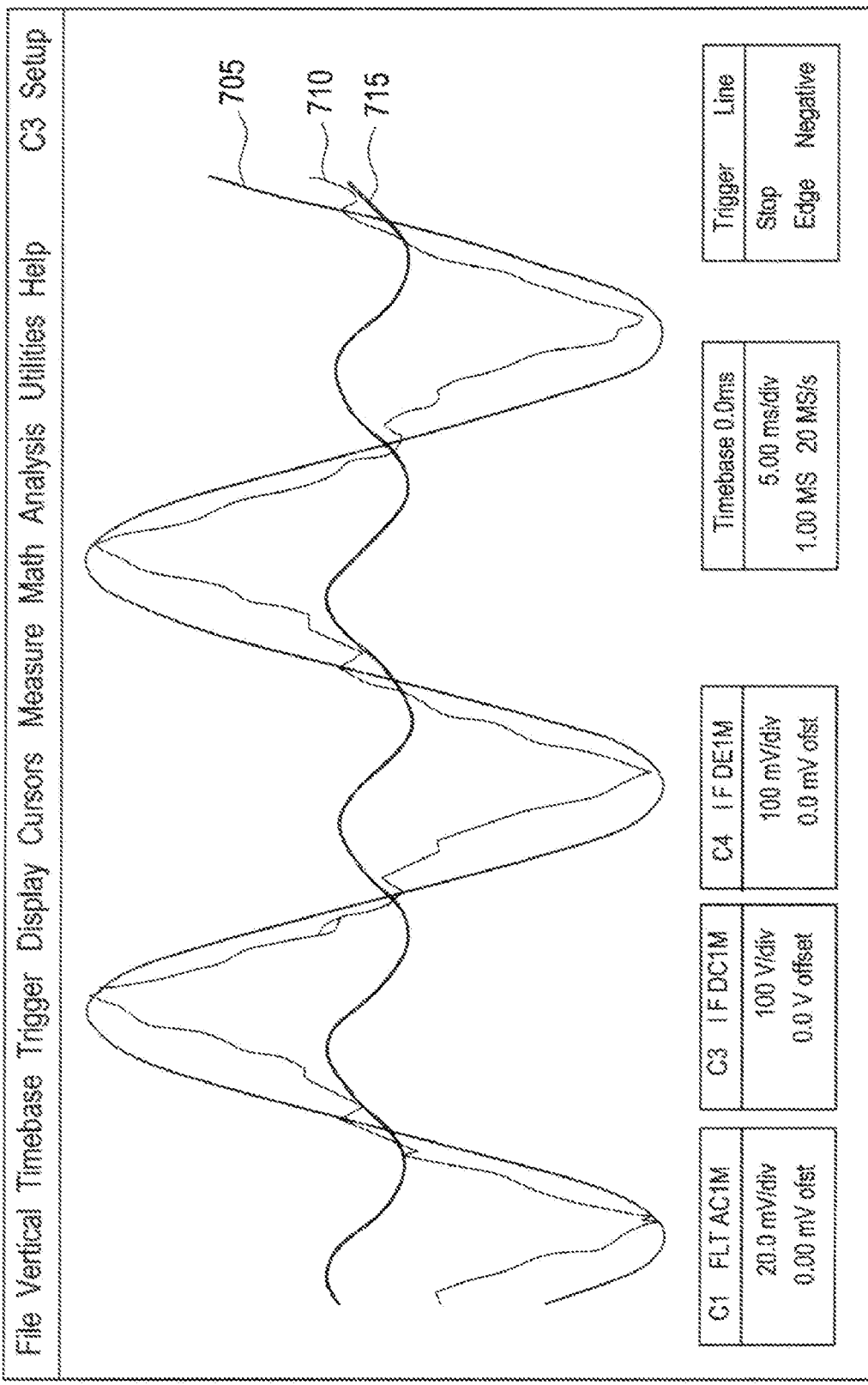
FIG. 7 is a screenshot illustrating an unbalanced linear load with a variable parameter of K=0.

FIGS. 6 and 7 are screenshots showing the experimental results obtained from a UPS supplying power to an unbalanced load. FIG. 6 shows the mode of operation that is obtained when K=1. In this instance, the input current 610 is sinusoidal, but the battery ripple current 615 is 40App. In addition, the input power factor is 1 as shown from the voltage 605 being in phase with the current. FIG. 7 shows the mode of operation that is obtained when K=0. In this instance, the input current 710 is not sinusoidal, but the battery ripple current 715 is reduced to 16App.

The flow diagrams depicted herein are presented as illustrative examples. As such, there may be many variations to these diagrams or the steps (or operations) described herein that may be implemented without departing from the spirit of the invention. All subsequent variations are considered a part of the claimed invention.

While the invention has been described with reference to exemplary embodiments, it will he understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Further, the use of the terms a, an, etc. do not denote a limitation of quantity, but rather denote the presence of at least one of the referenced item.

What is claimed:

1. An active rectifier control system that is configured to enhance the response control performance for an uninterruptible power supply (UPS) system for servicing a load, the active rectifier control system providing rigid control of a direct current (dc) link voltage resulting from the combined linked outputs of a battery and the active rectifier, thus reducing the power drawn from the battery, the control system comprising:
a feed-forward voltage controller, the feed-forward voltage controller comprising:
a proportional-integral (PI) controller component, the PI controller component being configured to determine a voltage error reference current value in response to a dc voltage reference and a dc voltage input values;
a feed-forward current determining component, the feed-forward current determining component being configured to determine a feed-forward current value in response to an active current input value, wherein the active current input value is a value determined by a function of active power required by the load and the dc link voltage, and the feed-forward current value is determined from a summation of current outputs of separate functions' separate function of the active current input value;
a variable limitation component, the variable limitation component being configured to determine a limited reference current value in response to a dc reference input value; and
a current control component, the current control component being configured to receive the determined limited reference current value from the variable limitation component, wherein the determined limited reference current value is utilized as a reference value for a lower level current controller.

2. The control system of claim 1, wherein the active current input value is determined by dividing an active power load value by the dc voltage input value.

3. The control system of claim 2, wherein the dc reference input value is determined from a summation of the voltage error reference current value and the feed-forward current value.

4. The control system of claim 1, wherein the feed-forward current value is determined from a summation of a first feed-forward current value, a second feed-forward current value, and a third feed-forward current value.

5. The control system of claim 4, wherein the first feed-forward current value is determined by passing the active current input value through a selective step filter and then multiplying the active current input value by a variable parameter of KJ.

6. The control system of claim 5, wherein the second feed-forward current value is determined by passing the active current input value through a low-pass filter and then multiplying the active current input value by a variable parameter of K.

7. The control system of claim 6, wherein the third feed-forward current value is determined by multiplying the active current value by a variable parameter of 1−K.

8. The control system of claim 7, wherein $0 \leq K \leq 1$.

9. An active rectifier control system method for enhancing the response control performance of an uninterruptible power supply (UPS) system for servicing a load, the active rectifier control system providing rigid control of a direct current (dc) link voltage resulting from the combined linked outputs of a battery and the active rectifier, thus reducing the power drawn from the battery, the method comprising:
determining an active power load value;
dividing the active power load value by a dc voltage value in order to determine an active current input value;
determining a feed-forward current value, wherein the feed-forward current value is determined from a summation of current outputs of separate functions' separate function of the active current input value;
determining a voltage error reference current value;
determining a dc reference input value from a summation of the voltage error reference current value and the feed-forward current value;
providing the dc reference input value to a variable limitation component, wherein the variable limitation component is configured to utilize the dc reference input value to calculate a limited reference current value; and
providing the limited reference current value to a current control component.

10. The method of claim 9, wherein the feed-forward current value is determined from a summation of a first feed-forward current value, a second feed-forward current value, and a third feed-forward current value.

11. The method of claim 10, wherein the first feed-forward current value is determined by passing the active current input value through a selective step filter and then multiplying the active current input value by a variable parameter of KJ.

12. The method of claim 11, wherein the second feed-forward current value is determined by passing the active current input value through a low-pass filter and then multiplying the active current input value by a variable parameter of K.

13. The method of claim 12, wherein the third feed-forward current value is determined by multiplying the active current value by a variable parameter of 1−K.

14. The method of claim 11, wherein $0 \leq K \leq 1$.

15. The method of claim 14, where in the event that $0<K<1$, then the active current input value is divided into a predetermined proportion among the second *feed-forward* current value and the third *feed-forward* current *value*.

* * * * *